United States Patent [19]
Uji

[11] Patent Number: 5,417,053
[45] Date of Patent: May 23, 1995

[54] PARTIAL REGENERATIVE DUAL FLUID CYCLE GAS TURBINE ASSEMBLY

[75] Inventor: Shigekazu Uji, Ichikawa, Japan

[73] Assignee: Ishikawajima-Harima Heavy Industries Co., Ltd., Japan

[21] Appl. No.: 186,155

[22] Filed: Jan. 25, 1994

[30] Foreign Application Priority Data

Feb. 26, 1993 [JP] Japan .................................. 5-037217

[51] Int. Cl.⁶ .............................................. F02C 3/30
[52] U.S. Cl. ................... 60/39.07; 60/39.58; 60/39.59
[58] Field of Search ............... 60/39.05, 39.07, 39.53, 60/39.55, 39.58, 39.59

[56] References Cited

U.S. PATENT DOCUMENTS

| | | |
|---|---|---|
| 2,482,819 | 9/1949 | Williams . |
| 3,353,360 | 11/1967 | Gorzegno ........................ 60/39.59 |
| 4,041,699 | 8/1977 | Schelp ............................. 60/39.59 |
| 4,653,268 | 3/1987 | Nakamura et al. ............. 60/39.53 |
| 4,660,367 | 4/1987 | Johnson ........................... 60/39.53 |
| 5,271,216 | 12/1993 | Frutschi et al. ................. 60/39.58 |

FOREIGN PATENT DOCUMENTS

| | | |
|---|---|---|
| 0041873 | 12/1981 | European Pat. Off. . |
| 0081996 | 6/1983 | European Pat. Off. . |
| 1168070 | 12/1958 | France . |
| 2101936 | 3/1972 | France . |
| 2332698 | 1/1974 | Germany ........................ 60/39.59 |
| 1104075 | 2/1968 | United Kingdom . |

OTHER PUBLICATIONS

Power, vol. 133, No. 6, 1 Jun. 1989, New York US, pp. 43-48, Makanski, "Brayton Cycles Challenge Rankine for Dominance", Fig. 3.

*Primary Examiner*—Louis J. Casaregola
*Attorney, Agent, or Firm*—Cushman Darby & Cushman

[57] ABSTRACT

A partial regenerative dual fluid cycle gas turbine assembly can reduce the amount of steam injected to the combustor and can reduce the pressure loss in the heat exchanger and in pipes around the heat exchanger, thereby improving the efficiency of the gas turbine. The partial regenerative dual fluid cycle gas turbine assembly has a gas turbine unit including a compressor for compressing air, a combustor for burning fuel, and a turbine, driven by the combustion gas, for driving the compressor. A steam-driven mixer boosts the air and mixes the steam and the air. A heat exchanger is arranged downstream of the turbine for heating the mixed gas from the mixer with heat from the turbine exhaust gas. A heat recovery steam generator is arranged downstream of the heat exchanger for producing steam with heat from the exhaust gas. An air line is provided for introducing a first portion of the compressed air from the compressor to the combustor and for introducing a second portion of the compressed air to the mixer. A main steam line is provided for introducing a portion of the steam from the heat recovery steam generator to the mixer. A mixed gas line is provided for introducing the mixed gas from the mixer to the combustor via the heat exchanger. The mixer can include either a steam turbine-driven compressor or an ejector. A second portion of the steam produced by the heat recovery steam generator can be segregated for use by external utilities.

5 Claims, 6 Drawing Sheets

PARTIAL REGENERATIVE DUAL FLUID CYCLE GAS TURBINE ASSEMBLY

FIELD OF THE INVENTION

The present invention relates to a partial regenerative dual fluid cycle gas turbine used in the field of gas turbine co-generation of both electric power (or motive power) and steam.

DESCRIPTION OF THE PRIOR ART

A dual fluid cycle gas turbine assembly of the prior art is shown in FIG. 8 wherein air "A" sucked into a compressor 1 is compressed therein and flows into a combustor 2. The compressed air burns fuel "F" and forms a combustion gas of high temperature. The combustion gas flows in to a turbine 3, performs work therein, and the resulting exhaust gas "E" is exhausted to the atmosphere after having generated steam "S" in a heat recovery steam generator 4. The steam "S" is injected into the combustor 2, which increases both the flow rate and the specific heat of the combustion gas flowing into turbine 3, and thus increases the power of turbine 3. The power generated by turbine 3 drives both compressor 1 and a generator 5 to generate electric power. Water is fed by a pump 11 to an economizer 6, before being fed to heat recovery steam generator 4. A stack 9 is arranged downstream of heat recovery steam generator 4.

There are problems, however, with the prior art dual fluid cycle gas turbine of FIG. 8. Because the amount of steam injected may be up to 20–30% of the amount of air, if the injection of the steam is stopped, the flow rate into the turbine is excessively reduced and the thermal efficiency of the turbine is greatly reduced. Another problem is that, since the injected steam is exhausted to the atmosphere together with the exhaust gas, the more steam is injected, the more water is required to generate steam, and thus the greater the operating cost.

A prior art regenerative dual fluid cycle gas turbine assembly is shown in FIG. 9. A heat exchanger (called regenerator) 7 is arranged downstream of a turbine 3. Air "A" compressed by a compressor 1 is fed into a combustor 2 after having been pre-heated by the heat of exhaust gas "E" in regenerator 7. Regenerator 7 raises the temperature of the compressed air fed into combustor 2 and decreases the consumption of fuel "F" in combustor 2.

One problem with the prior art regenerative cycle gas turbine of FIG. 9, is that it is impossible to greatly improve the thermal efficiency, since the pre-heating of air is limited due to the high outlet temperature of compressor 1. In addition, all of the air compressed by compressor 1 is pre-heated by the exhaust heat in regenerator 7 before it is introduced to combustor 2. This causes several problems. One problem is that pressure loss in regenerator 7 and in the pipes around regenerator 7 causes a reduction of the thermal efficiency. Another problem is that the great heat capacity of the regenerator 7 lowers the responsiveness of the gas turbine control. A third problem is that a very large bypass valve 8 must be used for preventing excess speed (over speed) of turbine 3 when load shed occurs, because the regenerator has a large time constant:

It is an object of the present invention to solve the above problems with the prior art turbine assemblies.

It is specifically an object of the present invention to provide a partial regenerative dual fluid cycle gas turbine which can reduce the amount of steam injected into the combustor.

It is also an object of the present invention to reduce pressure loss in the regenerator and in the pipes around the regenerator.

It is a further object to improve the efficiency of the gas turbine.

SUMMARY OF THE INVENTION

According to the present invention, there is provided a partial regenerative dual fluid cycle gas turbine assembly comprising a gas turbine unit including a compressor for producing compressed air; a combustor for burning fuel and producing combustion gas; and a turbine driven by the combustion gas, which produces exhaust gas and drives the compressor. A steam-driven mixer is provided for boosting the air and mixing steam and air to produce a mixed gas. A heat exchanger is arranged downstream of the turbine for heating the mixed gas from the mixer with heat from the exhaust gas. A heat recovery steam generator is arranged downstream of the heat exchanger for producing steam with heat from the exhaust gas. An air line is provided for introducing a first portion of the compressed air from the compressor to the combustor and for introducing a second portion of the compressed air to the mixer. A main steam line is provided for introducing a portion of the steam produced by the heat recovery steam generator to the mixer. A mixed gas line is provided for introducing the mixed gas from the mixer to the combustor via the heat exchanger.

According to one preferred embodiment of the present invention, the gas turbine assembly further comprises a first auxiliary steam line for segregating a second remaining portion of the steam generated by the heat recovery steam generator for external use, and a steam flow rate control valve arranged in the main steam line for distributing the steam generated by the heat recovery steam generator to the main steam line and to the first auxiliary steam line. It is also preferable that the gas turbine further comprises a second auxiliary steam line for bypassing the mixer and for communicating the main steam line with the mixed gas line. A steam bypass valve is preferably arranged in the second auxiliary steam line for controlling the ratio of air to steam heated by the heat exchanger.

In addition, according to another preferred embodiment of the invention, the mixer includes a compressor for further compressing the compressed air, a turbine driven by the steam for driving the compressor, and a confluent line for joining the compressed air from the compressor with the steam from the turbine. Alternatively, the mixer may include an ejector in which steam aspirates the compressed air.

Further objects, features and advantages of the present invention will become apparent from the Detailed Description of Preferred Embodiments when considered together with the attached Drawings.

DETAILED DESCRIPTION OF THE PREFERRED EMBODIMENTS

Figure 1:
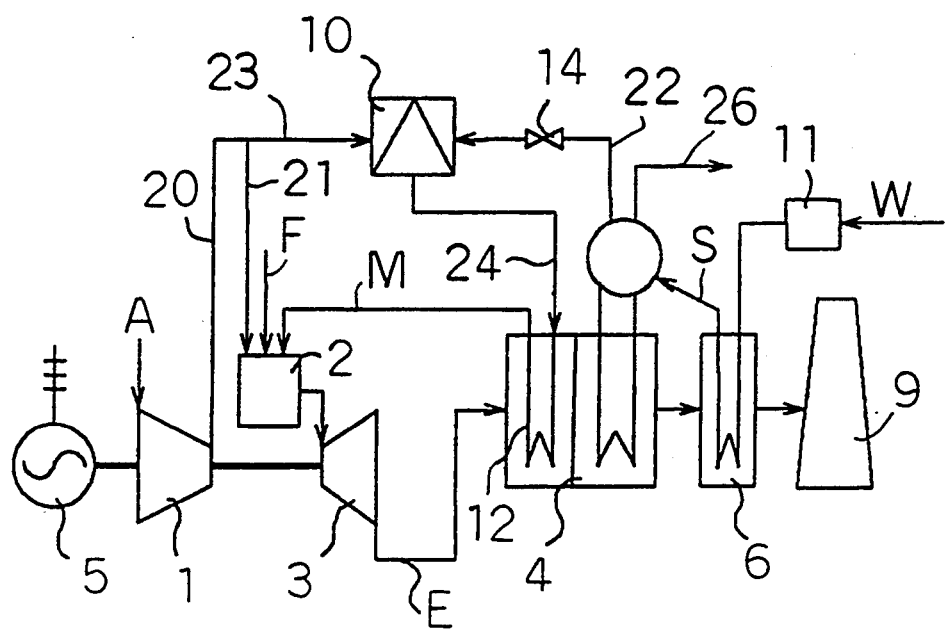
FIG. 1 is a schematic view showing a partial regenerative dual fluid cycle gas turbine assembly according to the present invention.

A preferred embodiment of the present invention will be hereinafter described with reference to the accompanying drawings in which the same structural components are designated by the same reference numerals.

FIG. 1 is a schematic view showing a partial regenerative dual fluid cycle gas turbine assembly according to the present invention. The gas turbine assembly comprises a gas turbine unit including a compressor 1 for compressing air "A", a combustor 2 for burning fuel "F", and a turbine 3, driven by combustion gas, for driving compressor 1. A mixer 10 driven by steam is provided for boosting the air and mixing steam with the air. A heat exchanger 12 is arranged downstream of turbine 3 for heating the mixed gas from mixer 10 with the turbine exhaust gas E. A heat recovery steam generator 4 is arranged downstream of heat exchanger 12 for evaporating water by using the turbine exhaust gas E as a heat source. An air line 20 introduces a portion of the compressed air from compressor 1 to combustor 2, and introduces a remaining portion of the compressed air to mixer 10. A main steam line 22 introduces a portion of the steam from heat recovery steam generator 4 to mixer 10. A mixed gas line 24 is provided for introducing the mixed gas from mixer 10 to combustor 2 via heat exchanger 12.

Air line 20 includes a line 21 for directly introducing a portion of the air compressed by compressor 1 to combustor 2, and a line 23 for introducing the remainder of the compressed air to mixer 10. Heat exchanger 12, for heating a mixed gas "M" of air and steam from mixer 10 with exhaust heat from the turbine unit, is arranged downstream of gas turbine 3.

The partial regenerative dual fluid cycle gas turbine further comprises a first auxiliary steam line 26 for segregating a remaining portion of the steam generated by heat recovery steam generator 4 for external use in other utilities (not shown). A steam flow rate control valve 14 is arranged in main steam line 22. Steam flow rate control valve 14 distributes the steam generated by heat recovery steam generator 4 to main steam line 22 and first auxiliary steam line 26.

Figure 2:
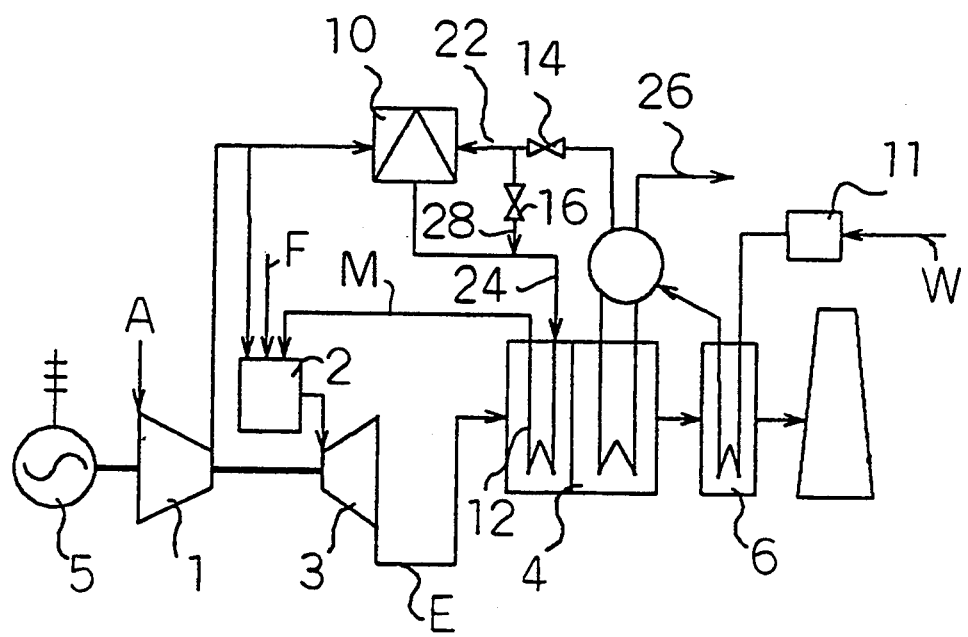
FIG. 2 is a schematic view showing another partial regenerative dual fluid cycle gas turbine assembly according to the present invention.

FIG. 2 shows another embodiment of the partial regenerative dual fluid cycle gas turbine assembly according to the present invention. As compared with the embodiment of FIG. 1, this embodiment further comprises a second auxiliary steam line 28 for bypassing mixer 10 and for communicating main steam line 22 with mixed gas line 24. A steam bypass valve 16 is arranged in second auxiliary steam line 28. Steam bypass valve 16 can control the relative flow rates of air and steam in the mixed gas M heated by heat exchanger 12. The remainder of the embodiment of FIG. 2 is substantially the same as the embodiment of FIG. 1.

Mixer 10 in the embodiments of FIGS. 1 and 2 functions (a) to boost the compressed air from air line 20 just before entering combustor 2, and (b) to mix this compressed air with part of the steam formed by heat recovery steam generator 4 to form a mixed gas M. Embodiments of these mixers 10 are shown in FIGS. 3 and 4.

Figure 3:
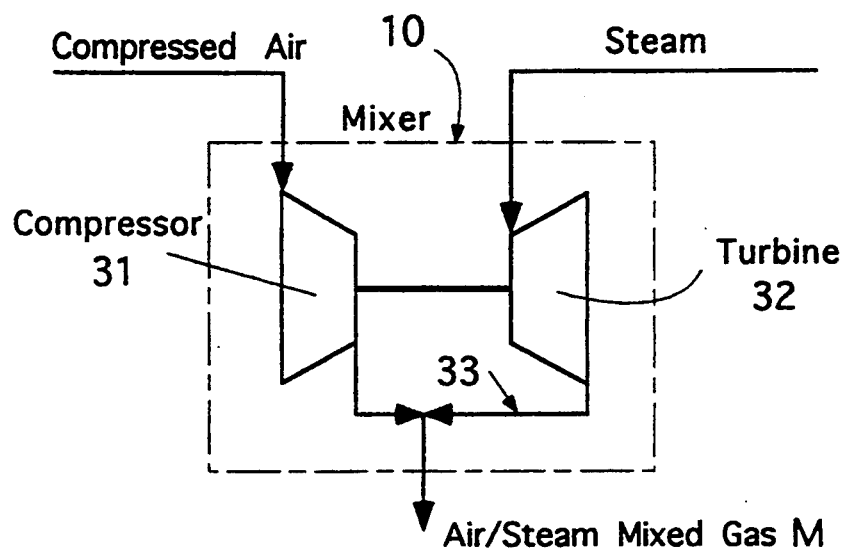
FIG. 3 is a schematic view showing a mixer used in a partial regenerative dual fluid cycle gas turbine assembly according to the present invention.

In the embodiment of FIG. 3, mixer 10 comprises a compressor 31, a steam-driven turbine 32 for driving compressor 31, and a confluent line 33 for joining compressed air from compressor 31 with steam from turbine 32. Accordingly, steam-driven mixer 10 is able to pressurize air and to mix the air with steam to form mixed gas M.

Figure 4:
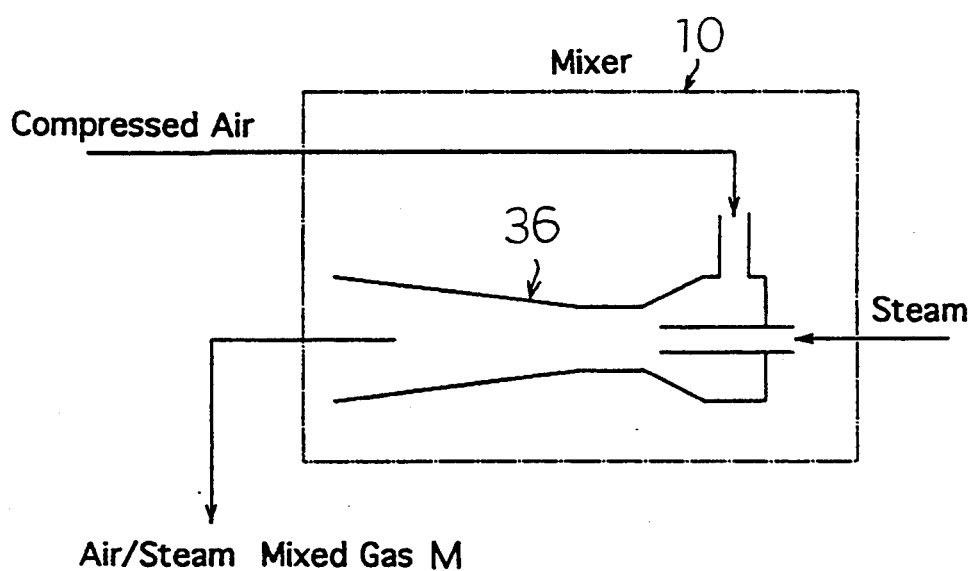
FIG. 4 is a schematic view showing another mixer used in a partial regenerative dual fluid cycle gas turbine assembly according to the present invention.

In the embodiment of FIG. 4, the mixer 10 comprises a steam-driven ejector 36 for aspirating the compressed air. Accordingly, this mixer 10 is also steam-driven and is able to pressurize the air and to mix the air with steam to form mixed gas M.

The partial regenerative dual fluid cycle gas turbine assemblies shown in FIGS. 1 and 2 operate as follows.

Air "A" which functions as a working fluid is sucked into the compressor 1 from the atmosphere. A portion of the air is introduced to combustor 2 after having been compressed by compressor 1. The remaining portion of the compressed air is taken via line 23 from air line 20 upstream of combustor 2 and is introduced to mixer 10.

Compressed air is boosted in mixer 10 by steam pressure, and a mixed gas of air and steam is then introduced to heat exchanger 12 and heated by the exhaust heat of turbine 3. The compressed, mixed gas M is then sent to combustor 2. The temperature of the compressed, mixed gas M is raised by the combustion of the fuel "F" together with the compressed air flowing via line 21 into combustor 2 directly from compressor 1.

After having worked in turbine 3, the high temperature and pressure combustion gas formed in combustor 2 is exhausted as exhaust gas E and is sequentially passed through heat exchanger 12, heat recovery steam generator 4 and economizer 6. After the turbine exhaust heat in exhaust gas E is recovered by heat exchanger 12, heat recovery steam generator 4, and economizer 6, exhaust gas E is finally released to the atmosphere by means of stack 9.

Feed water "W" is pressurized by a pump 11 and then fed to an economizer 6. The saturated water from econ- omizer no is fed to heat recovery steam generator 4 and then becomes saturated steam. The saturated steam is then sent to mixer 10 after having been metered by steam flow rate control valve 14. It is possible to use part of the steam generated by boiler 4 for external utilities without sending it to mixer 10.

Figure 5:
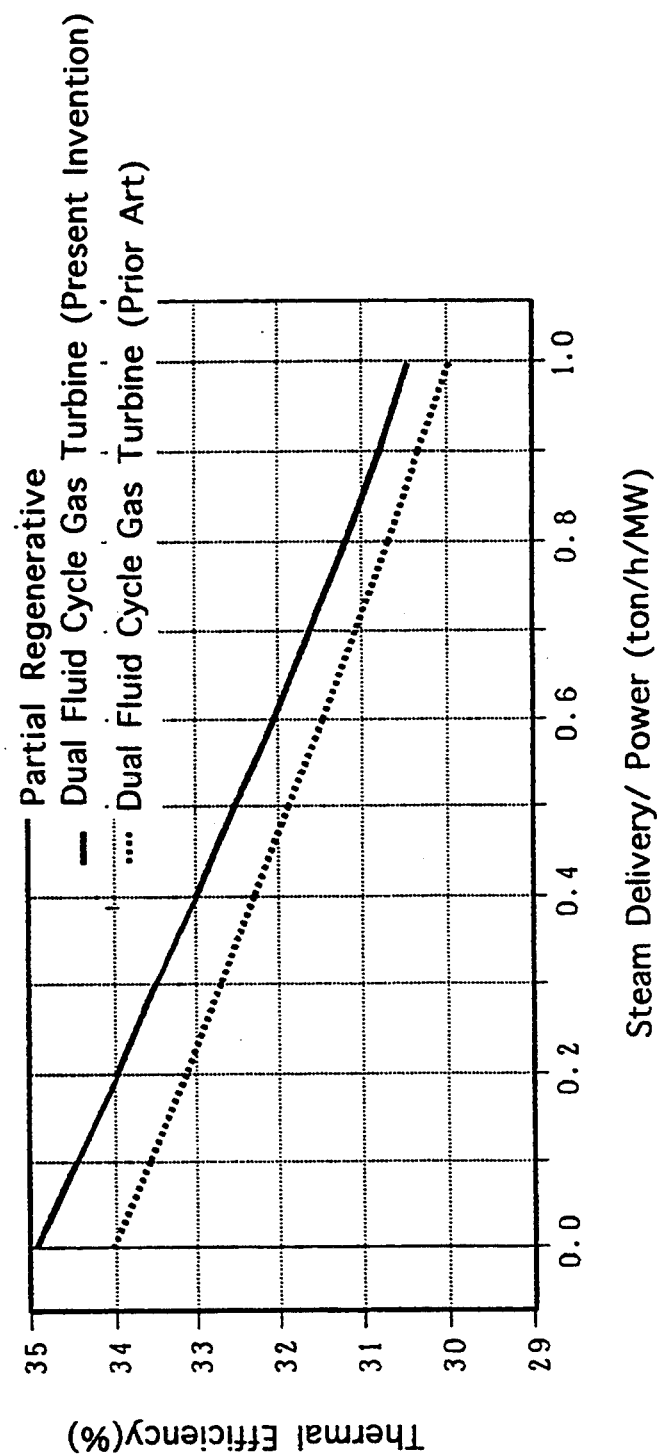
FIG. 5 is a graph showing the thermal efficiency versus the ratio of steam delivery/power output for a partial regenerative dual fluid cycle gas turbine assembly of the present invention as compared with that of a dual fluid gas turbine of the prior art.
Figure 7:
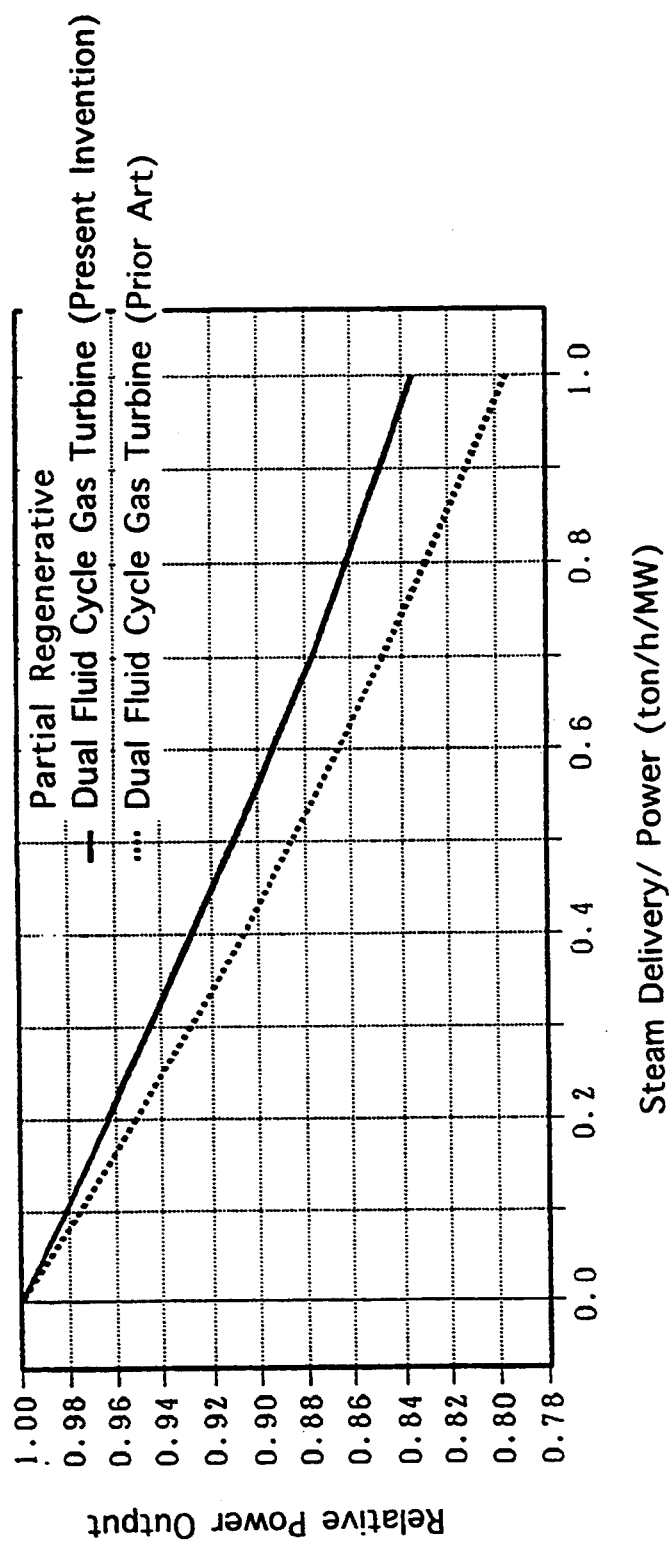
FIG. 7 is a graph showing the relative power output versus the ratio of steam delivery/power output for a partial regenerative dual fluid cycle gas turbine assembly of the present invention as compared with that of a dual fluid cycle gas turbine of the prior art.
Figure 8:
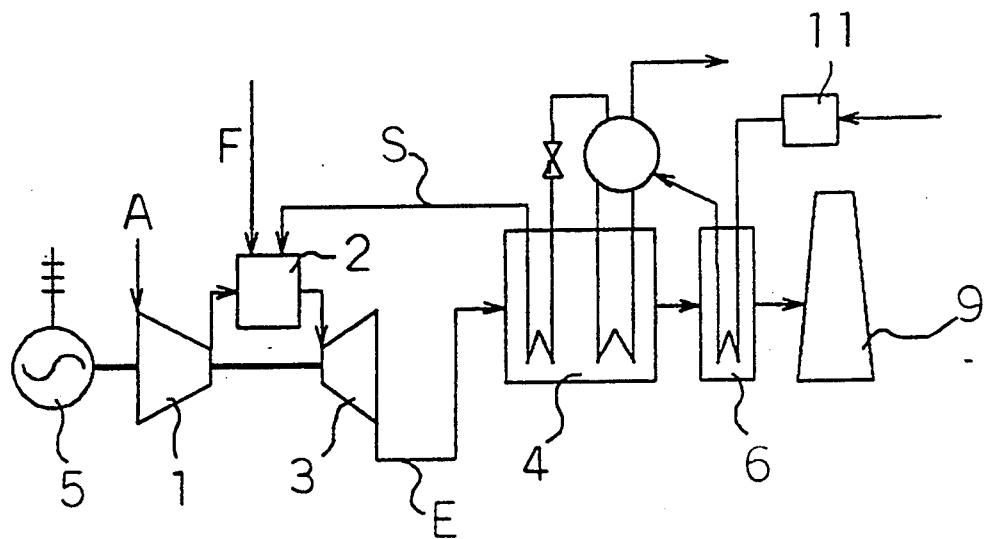
FIG. 8 is a schematic view showing the structure of a dual fluid cycle gas turbine of the prior art.
Figure 9:
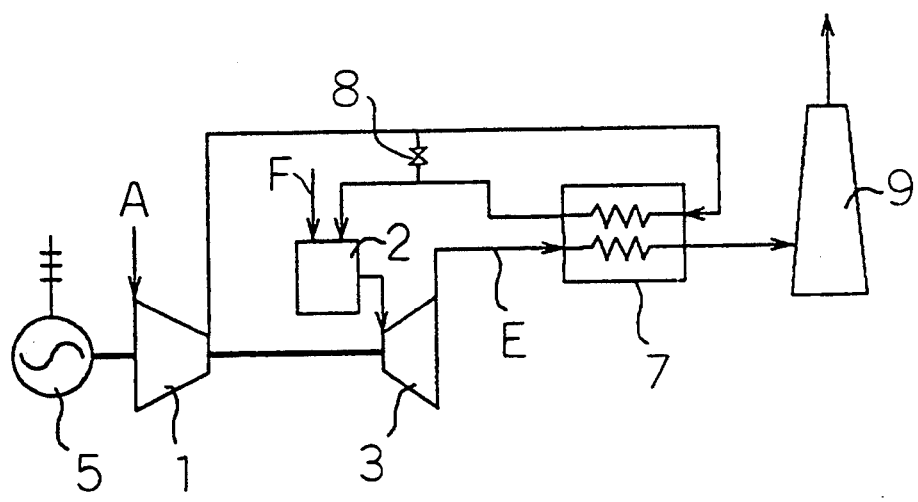
FIG. 9 is a schematic view showing a regenerative cycle gas turbine of the prior art.

By use of the partial regenerative dual fluid cycle gas turbine assembly of the present invention, it is possible to realize higher thermal efficiency than that of the dual fluid cycle gas turbines of the prior art. FIG. 5 shows the thermal efficiency of a partial regenerative dual fluid cycle gas turbine assembly of the present invention compared with that of a dual fluid cycle gas turbine of the prior art. In considering the application of the present invention to gas turbine co-generation, it is necessary to compare the thermal efficiency under conditions of constant delivery of utility steam per unit of power ratio. Thus the units of the abscissa of FIG. 5 are defined as the ratio of the amount of steam delivered per power output (ton/h/MW). The partial regenerative dual fluid cycle gas turbine of the present invention, because it recovers turbine exhaust heat by the mixture of part of the compressed air bled from the compressor outlet and the saturated steam generated by the recovery of the turbine exhaust heat, minimizes the energy loss in the exhaust heat recovery system. The thermal efficiency of the entire assembly can thus be remarkably improved, compared with a turbine exhaust heat recovery method carried out by only using a steam superheater, as in the dual fluid cycle gas turbine of the prior art (FIG. 8). The advantages obtained by the present invention are not limited to within the ranges of ton/h/MW shown in FIGS. 5, 6 and 7. Advantageous effects are obtained up to about 3 ton/h/MW.

Figure 6:
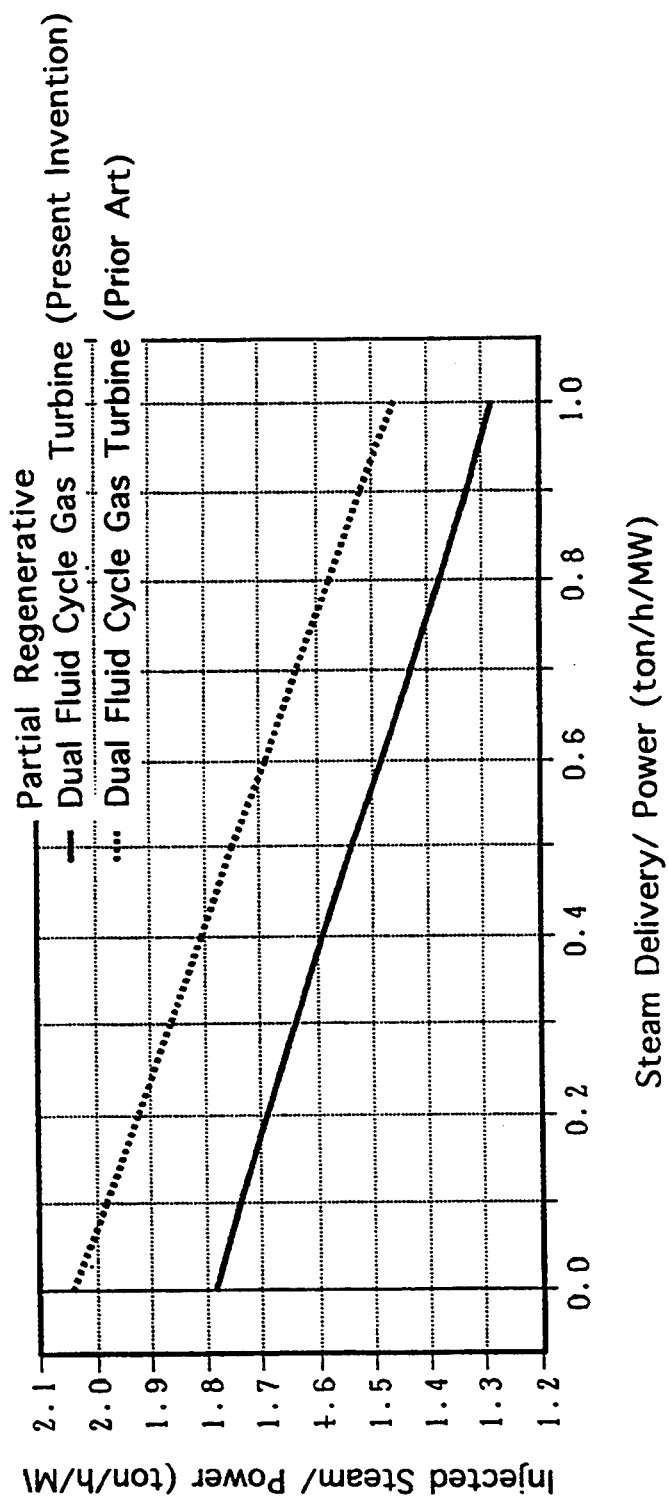
FIG. 6 is a graph showing the ratio of injected steam/power versus steam delivery/power output for a partial regenerative dual fluid cycle gas turbine assembly of the present invention as compared with that of a dual fluid cycle gas turbine of the prior art.

FIG. 6 shows injected steam per unit powers versus steam delivery per unit power for both the present invention and a dual fluid cycle turbine of the prior art. And FIG. 7 shows that the relative power output versus steam delivery per unit power output is greater for the gas turbine of the present invention. This greater relative power output is because the amount of the steam injected is not as great as in the dual fluid cycle gas turbine of the prior art as shown in FIG. 6. This advantageous effect is again due to the injection into combustor 2 of a mixture of steam and compressed air after the addition of heat to the mixture in heat exchanger 12. Accordingly, the variation of the flow rate in the turbine is not as great as in the dual fluid cycle gas turbine of the prior art. Thus, as shown in FIG. 7, the power is not decreased as much as the dual fluid cycle gas turbine of the prior art if the amount of utility steam delivered is increased while the amount of the steam injected into the combustor is decreased.

Since the gas turbine assembly of the present invention is provided with a mixer for mixing steam and compressed air, and the mixed gas is fed to the combustor after having been pre-heated by the heat exchanger, the amount of the steam needed to be generated by the turbine exhaust heat can be reduced and the thermal efficiency thereof can be increased. Accordingly, variations of the power and the thermal efficiency of the gas turbine assembly can be minimized even if the amount of the steam injected into the combustor is changed. In addition, since the mixer can boost the air using the steam as a power source, it is possible to compensate for pressure loss in the air line and to improve the overall thermal efficiency of the gas turbine assembly.

While the present invention has been illustrated by means of several preferred embodiments, one of ordinary skill in the art will recognize that modifications, additions and improvements can be made while remaining within the scope and spirit of the present invention. The scope of the present invention is determined solely by the appended claims.

What is claimed is:

1. A partial regenerative dual fluid cycle gas turbine assembly comprising:
   a gas turbine unit including a compressor for producing compressed air, a combustor for burning fuel to produce combustion gas, and a turbine driven by the combustion gas and producing exhaust gas, wherein the turbine is operatively connected to drive the compressor;
   a steam-driven mixer for pressurizing air and mixing steam with air to produce a mixed gas;
   a heat exchanger arranged downstream of the turbine for heating the mixed gas from the mixer with heat from the exhaust gas;
   a heat recovery steam generator arranged downstream of the heat exchanger for producing steam with heat from the exhaust gas;
   a first air line for introducing a first portion of the compressed air from the compressor to the combustor;
   a second air line for introducing a second portion of the compressed air to the mixer;
   a main steam line for introducing a first portion of the steam produced by the heat recovery steam generator to the mixer; and
   a mixed gas line for introducing the mixed gas from the mixer to the combustor via the heat exchanger.

2. A gas turbine assembly according to claim 1, further comprising an auxiliary steam line for segregating a second remaining portion of the steam generated by said heat recovery steam generator for external use, and a steam flow rate control valve arranged in said main steam line for distributing the steam generated by said heat recovery steam generator between said main steam line and the auxiliary steam line.

3. A gas turbine assembly according to claim 1, further comprising a second auxiliary steam, line for bypassing said mixer and for communicating said main steam line with said mixed gas line, and a steam bypass valve arranged in the auxiliary steam line for controlling the relative flow rates of air to steam in the mixed gas heated by said heat exchanger.

4. A gas turbine assembly according to claim 1, wherein said mixer includes a compressor for further compressing said compressed air, a steam-driven turbine for driving the compressor, and a confluent line for joining the compressed air from the compressor with the steam from the turbine to form said mixed gas.

5. A gas turbine assembly according to claim 1, wherein said mixer includes an steam-driven ejector for aspirating compressed air and forming said mixed gas.

* * * * *